United States Patent [19]

Orain

[11] Patent Number: 4,741,723
[45] Date of Patent: May 3, 1988

[54] SLIDABLE HOMOKINETIC JOINT, IN PARTICULAR FOR A LATERAL VEHICLE TRANSMISSION

[75] Inventor: Michel A. Orain, Conflans Ste Honorine, France

[73] Assignee: Glaenzer Spicer, Poissy, France

[21] Appl. No.: 851,147

[22] Filed: Apr. 11, 1986

[30] Foreign Application Priority Data

Apr. 19, 1985 [FR] France ................ 85 05995

[51] Int. Cl.$^4$ .............................................. F16D 3/20
[52] U.S. Cl. ...................................... 464/111; 384/49; 464/120; 464/167; 464/905
[58] Field of Search ................ 384/49; 464/111, 120, 464/139, 162, 167, 905, 906

[56] References Cited

U.S. PATENT DOCUMENTS 1,201,791  10/1916  Anderson .............................. 384/49

FOREIGN PATENT DOCUMENTS

| 2952029 | 7/1981 | Fed. Rep. of Germany. |
| 2164033 | 7/1973 | France. |
| 2476251 | 8/1981 | France. |
| 2506872 | 12/1982 | France. |
| 59-40016 | 3/1984 | Japan .................... 464/111 |
| 2099549 | 12/1982 | United Kingdom ........... 464/111 |
| 2099551A | 12/1982 | United Kingdom. |
| 2106219 | 4/1983 | United Kingdom ........... 464/111 |

Primary Examiner—Daniel P. Stodola
Attorney, Agent, or Firm—Wenderoth, Lind & Ponack

[57] ABSTRACT

A homokinetic joint including a first element (1,2) extending along a first axis and carrying three radial arms (3) evenly angularly spaced apart and defining spherical bearing surfaces (4), a second element (10) having a second axis intersecting the first axis and capable of making an angle therewith, the second element defining three pairs of raceways (9), intermediate elements (5) disposed between the spherical bearing surfaces and the raceways, rolling members (8) being interposed between the intermediate elements (5) and the adjacent raceways (9). The raceways (9) provided on the second element (10) are formed by cylindrical surfaces having a roughly circular cross-section and generatrices parallel to the axis of the second element, the rolling members being balls (8).

18 Claims, 3 Drawing Sheets

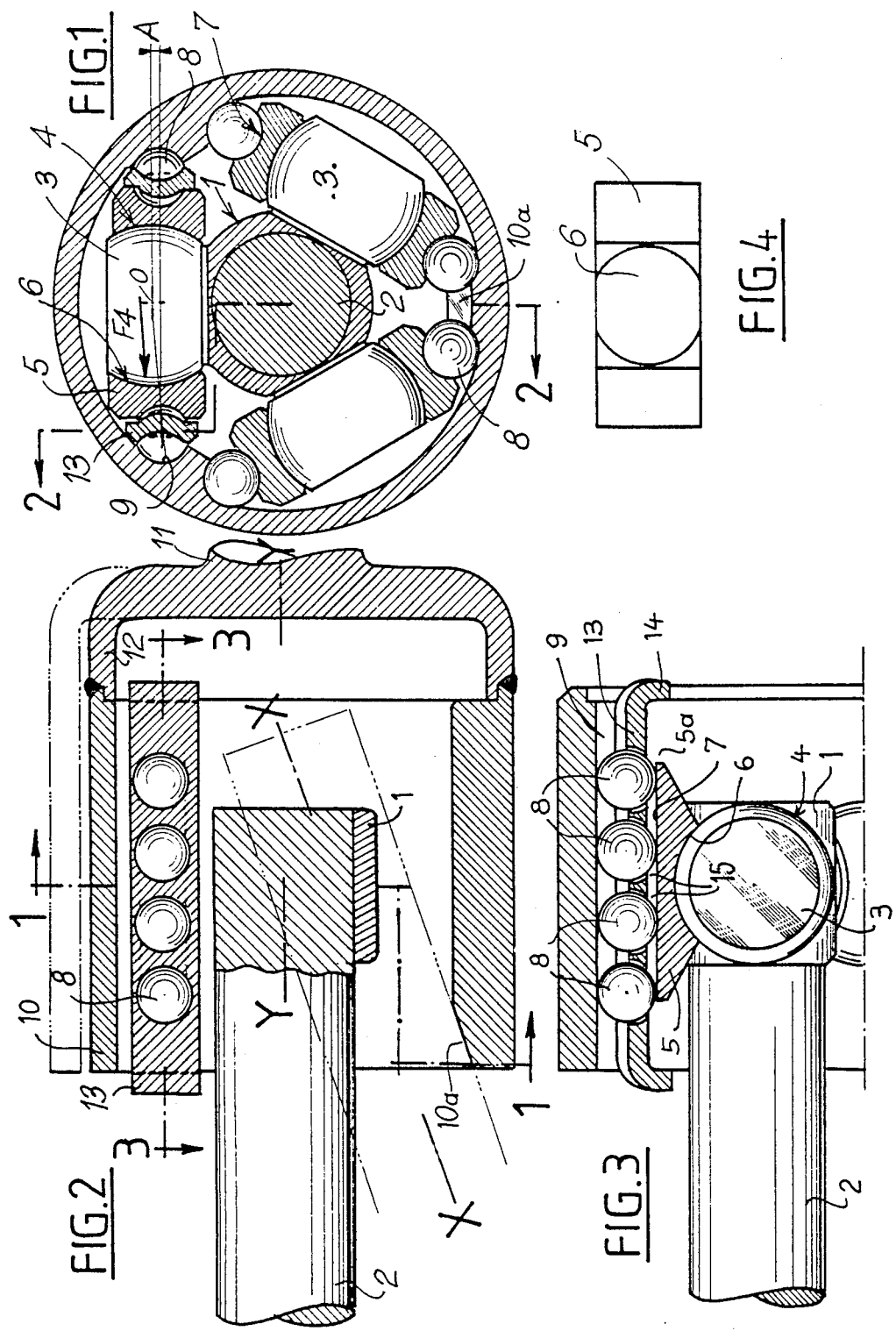

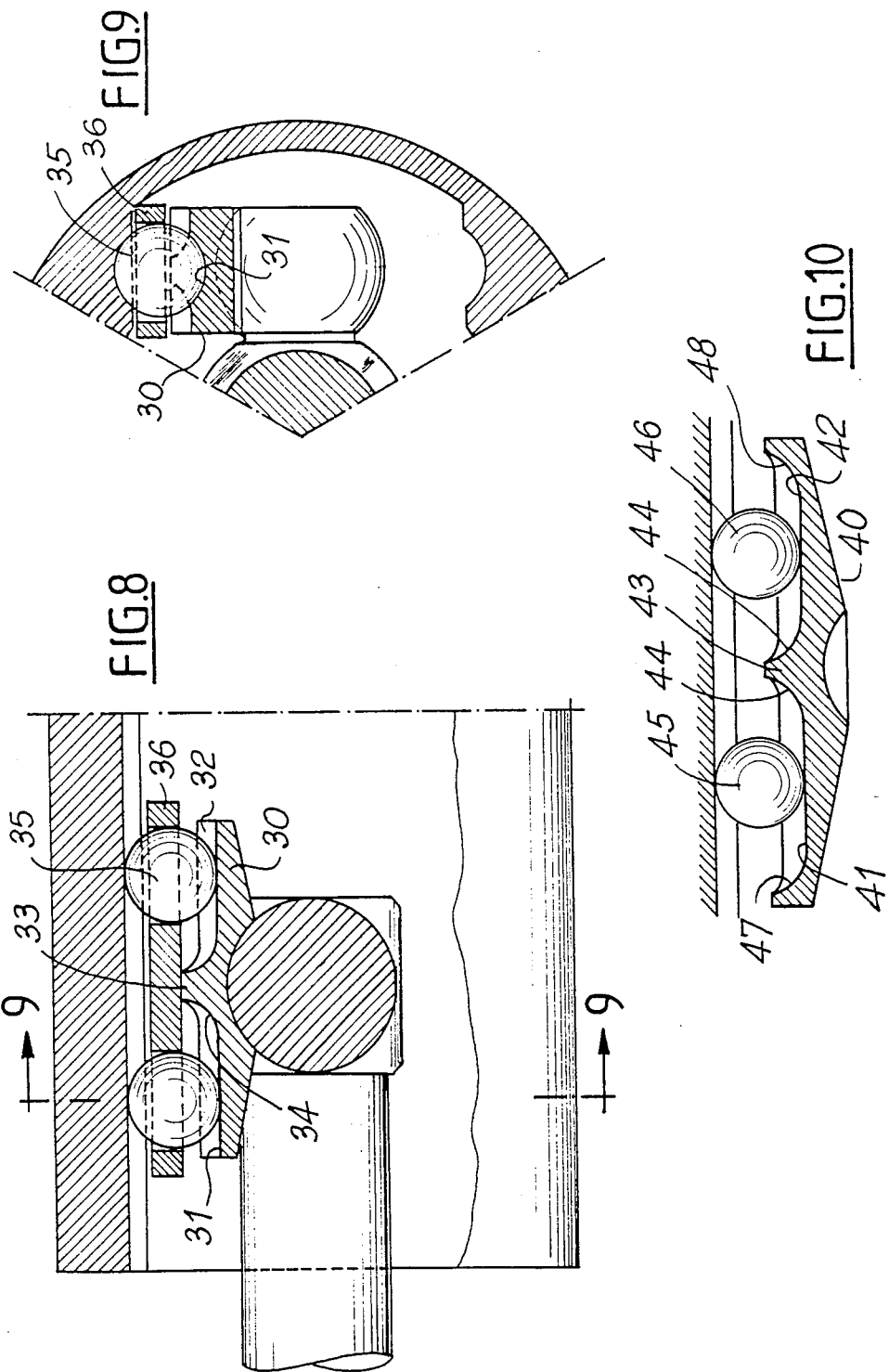

SLIDABLE HOMOKINETIC JOINT, IN PARTICULAR FOR A LATERAL VEHICLE TRANSMISSION

BACKGROUND OF THE INVENTION

1. Field of the Invention

The present invention relates to slidable homokinetic joints which may be used in particular in lateral transmissions of motor vehicles which have a front-wheel drive or a drive through independent wheels.

2. Description of the Prior Art

It is known that internal combustion engines are the center of vibrations of amplitudes which vary within a wide frequency band, on the order of 30 to 300 hertz. A slidable homokinetic joint should not only transmit the torque at an operating angle and with variable elongations, but also be axially infinitely permeable, both for a zero operating angle and at a maximum operating angle, so as to prevent the axial components of the vibrations of the engine to travel toward the driving wheel and the structure of the vehicle. Lastly, it should not, when it operates at an operating angle, itself introduce a periodic axial excitation capable of initiating vibrations in the structure of the vehicle.

Now, due to operating frictions whose amplitude varies cyclically, known slidable homokinetic joints have the following drawbacks:

The moments perpendicular to the axis of rotation produced by the frictions vary periodically and create corresponding excitations which may cause resonances in the structure of the vehicle or in the transmission shaft itself.

These periodic variations of friction result from the manner in which the rolling members move which, depending on the considered phase angle, roll or slide under a high load and thus bring about very high fluctuations in the resulting moment. Such an operation, in which is given rolling body (such as a ball) passes from a practically pure rolling motion to a total sliding motion is completely different from that of a ball bearing in which the sliding rate is low and practically constant.

There is known from French patent application No. FR-A-81 10 796 (French Patent No. 2,506,872), a slidable homokinetic joint which has for its purpose to overcome the drawbacks mentioned hereinbefore and which proposes various modifications, all of which have the feature of comprising three pairs of rolling planes evenly angularly spaced about a first axis, the planes of each pair being parallel to each other and to this fixed axis, these rolling planes cooperating with needles interposed between the pairs of planes and intermediate elements, moreover in contact by spherical bearing surfaces which are complementary with journals evenly anglarly spaced apart and extending radially relative to the axis of a second element.

Such a joint constitutes a notable progress but it has been found that, when operating at an angle, the needles are made to slide in their plane so that it is necessary to provide means for retaining them laterally, which rather complicates the manufacture. Further, frictions occur between the ends of the needles and the retaining means, which is of course disadvantageous.

As in the joint briefly described hereinbefore, the invention proposes to provide a telescopically slidable homokinetic joint in which the vibrations coming from the driving element are filtered absorbed and which is moreover devoid or substantially devoid of periodic internal frictions. On the contrary, the object is to obtain a moment of friction which is constant in magnitude and direction, and a.sliding with a very high degree of freedom irrespective of the angle at which the joint operates, it being moreover ensured that the latter does not produce periodic axial stresses. Further, the specific drawbacks due to the presence of needles must also be eliminated.

The invention therefore provides a homokinetic joint comprising a first element arranged along a first axis and carrying three radial arms which are evenly angularly spaced apart and define spherical bearing surfaces, a second element having a second axis intersecting the first axis and capable of making an angle therewith, said second element defining three pairs of raceways, intermediate elements disposed between said spherical bearing surfaces and said raceways, rolling members being interposed between the intermediate elements and the adjacent raceways, wherein the raceways provided on the second element are cylindrical surfaces having a roughly circular cross-section and generatrices parallel to the axis of the second element, the rolling members interposed between the intermediate elements and the raceways being balls.

According to other features of the invention:

in operating at an angle, each intermediate element undergoes an oscillating motion about the axis of the associated raceways;

each intermediate element has on its side facing the adjacent raceway a similar raceway, i.e. a roughly cylindrical shape having a circular cross-section and generatrices parallel to the axis of the second element;

the intermediate elements are bars defining on one side a spherical bearing surface cooperating with the complementary spherical bearing surface of the first element and on an opposite side a raceway for the rolling members;

the balls interposed between an intermediate element and an adjacent raceway are maintained by a cage;

said cage comprises end-of-travel means cooperative with end surfaces of the intermediate elements;

each cage comprises ball retaining means on the side opposed to the raceway of the second element;

means are provided for constraining each cage to travel through one half of the travel effected by the center of a spherical bearing surface of the first element;

these means comprise a gear journalled on a pivot laterally carried by the cage and engaged with two racks respectively carried by the intermediate element and the second element;

each intermediate element defines a raceway separated into two portions by an intermediate wall;

each intermediate element comprises a raceway divided into at least two segments each of which receives at least one ball, each segment being terminated at its two ends by a roughly spherical wall connected to the cylindrical surface of the segment of the adjacent raceway.

BRIEF DESCRIPTION OF THE DRAWINGS

The invention will be described in more detail hereinafter with reference to the accompanying drawings which are given solely by way of examples and in which:

FIG. 1 is a cross-sectional view of a first embodiment of a joint according to the invention corresponding to a section line 1—1 in FIG. 2;

FIG. 2 is a sectional view taken on line 2—2 of FIG. 1;

FIG. 3 is a sectional view taken on line 3—3 of FIG. 2;

FIG. 4 is a detail view in the direction of arrow $F_4$ of FIG. 1;

FIG. 8 is a longitudinal sectional view of another modification;

FIG. 9 is a partial sectional view taken on line 9—9 of FIG. 8, and

FIG. 10 is a partial sectional view of another modification.

DETAILED DESCRIPTION OF THE PREFERRED EMBODIMENTS

Figure 5:
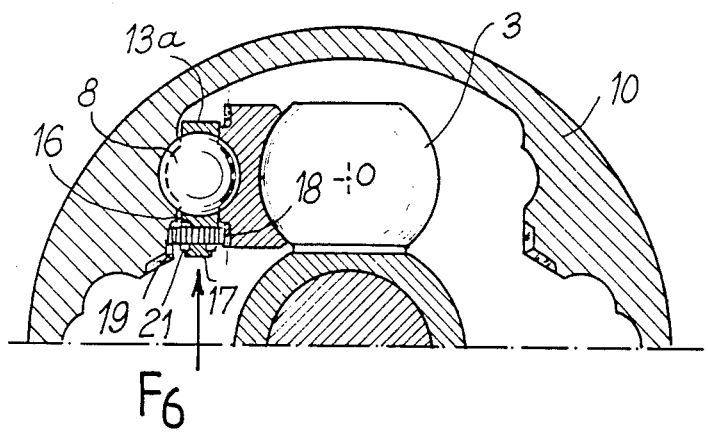
FIG. 5 is a partial cross-sectional view of a modification.

The joint shown in FIGS. 1 to 4 comprises a tripod element 1 rendered rigid with a shaft 2 having an axis X—X by splines, welding, or any other means. This tripod element carries three radially extending arms or trunnions 3 which are evenly angularly spaced apart and define convex spherical lateral surfaces 4 constituting bearing surfaces for intermediate elements or bars 5 which are capable of oscillating on these bearing surfaces. For this purpose, the bars define rectilinearly extending concave spherical bearing surfaces 6 which are complementary to the convex spherical bearing surfaces of the trunnions. Moreover, each of them includes on its opposite side a longitudinal cylindrical groove 7 of circular section acting as a raceway for a ring arrangement of balls 8. Each series of balls also rolls along a raceway 9 provided inside a tube or barrel 10 having an axis Y—Y. The six raceways formed in this barrel have a cylindrical shape of roughly circular section whose radius equals the radius of the balls or is slightly greater than this radius, and generatrices parallel to the axis Y—Y.

Each series of balls disposed between a bar 5 and a raceway 9 of the barrel is maintained, in this embodiment, by a cage 13 which may be for example made from a plastics material and whose longitudinal ends terminate in a flange 14 extending roughly radially toward the axis Y—Y and act as end-of-travel abutments cooperating with the longitudinal ends 5a of the bars 5.

Further, the cavities of these cages in which the balls are received have for example a frustoconical shape 15 for retaining the balls between the cages 13 and the barrel 10 when the latter no longer face the adjacent groove 7.

The diameter of these balls may be larger by 10 to 100 microns, in with respect to the two balls located at each end of the cage so as to achieve a centering return of the balls and an improved distribution of the load throughout the balls according to the teaching of the French patent application No. FR-A-83 17 576.

In the known manner, the barrel 10 may be rendered integral with a second shaft 11 such as by welding the barrel 10 to an enlarged portion 12 of this shaft.

In operation, when the joint operates at an angle, the tripod element 1 and consequently the shaft 2 have complete freedom to move angularly and axially while they are firmly maintained radially relative to the barrel. The slight radial displacements of the three spheres carried by the tripod element, accompanying the rotation at an angle, are accomodated by a slight oscillation of each bar 5 about the axis of the corresponding raceway. This manner of operation of the balls is quite novel and is not to be found in particular in the ball bearing slides employed in many applications which always undergo a pure movement of translation.

The radial movement of the spheres is three times larger toward the interior than toward the exterior and it is possible, according to an advantageous feature of the invention, to provide a compensation A on the order of 0.3 mm, consisting in shifting the center O of the sphere 3 beyond the line joining the axes of the facing raceways, in a radial section, and consequently associated with the same sphere 3. Thus, the modification of the clearance or of the gripping on the rolling members with which a trunnion is provided, owing to the modification of the obliqueness of the line of the center due to the varation of A, does not exceed 0.015 mm.

According to other advantages:

the rolling members (balls) guide themselves laterally in their two raceways, both on the barrel and on the intermediate elements. The intermediate elements are guided therefore in direction and in translation along three axes and at each instant solely by the rolling contact of the balls. Consequently, there is no need to guide the cage and there is consequently no risk of parasitic frictions appearing. Further, as there is no frictional guiding, there is no play in the directional guiding of the cage and the rolling members and therefore a slanting rolling is avoided. In other words, the balls have their axes of rotation always exactly perpendicular to the axis of the raceways, which corresponds to the purest rolling motion;

owing to the absence of the heel providing a lateral guiding, this type of bar allows a larger angular movement of the slidable shaft (see FIG. 2);

the bar is very simple in construction and the risks of lateral friction are avoided, which still further reduces the axial drag of this joint when sliding under torque;

the circle inscribed within the bar is larger than in the structure of the French patent application FR-A-81 10 796, for a given outside diameter, which allows a greater sliding, everything else being equal;

the rolling bodies are larger in size and smaller in number than in the case of the use of needles, so that the robustness or sturdiness of the joint is improved.

In order to increase the length of the sliding in the compression direction when the joint operates at an angle, a chamfer 10a is provided at the end of the second element or barrel 10 in the zones between two adjacent raceways 9. These chamfers provide an additional clearance for the movement of the shaft 2.

Figures 6, 7:
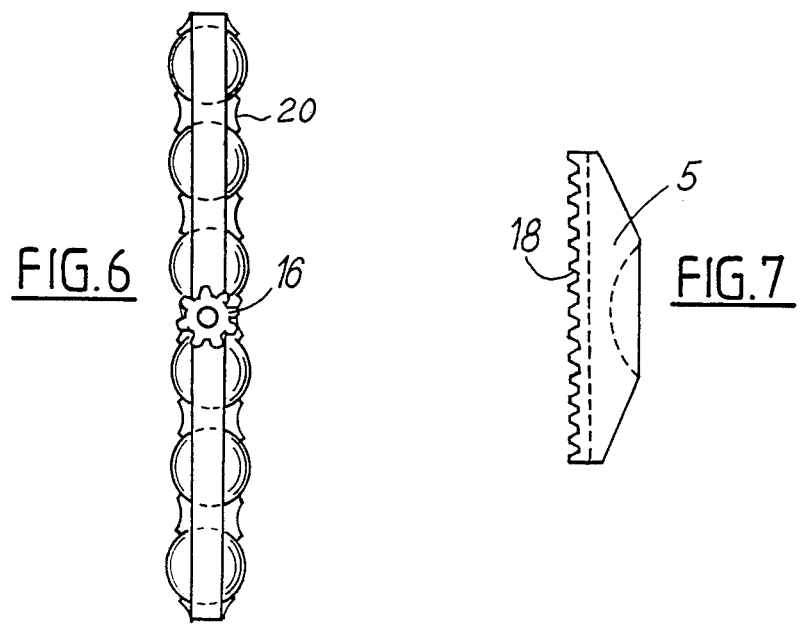
FIG. 6 is a bottom plan view in the direction of arrow $F_6$ of FIG. 5.
FIG. 7 is a top plan view of a rack carrying bar employed in the embodiment shown in FIGS. 5 and 6.

In the modification shown in FIGS. 5 to 7, means are provided for constraining the cage 13a associated with each ring arrangement of balls 8, to travel through one half of the travel effected by the center O of the sphere of the associated tripod element. These means comprise a small gear 16 journalled on a pivot pin 17 laterally carried by the cage 13a. This gear is engaged with two racks 18, 19 respectively carried by the second element or barrel 5 and the bar 10.

The cage may be made from a strong plastics material such as Nylon or from metal. The cage 13 includes projections 20 (FIG. 6) forming spherical recesses for retaining the balls 8, the projections 20 resulting from moulding or a forming operation after assembly, retain the balls when they are outside the raceways. The projections 20 as explained in the description of the first embodiment. A circlip 21 or any other known means retains the gear on its pivot pin 17.

In the embodiment shown in FIGS. 8 and 9, each bar 30 includes a rectilinearly extending raceway (for receiving balls 35) divided into two cylindrical sections or segments 31, 32 by an interposed wall 33 defining two spherical concave surfaces 34 of the same radius as the balls and connected to the cylindrical section of the raceways. In the illustrated embodiment, a ball 35 is provided on each side of this wall and the two balls are retained by a cage 36 which ensures a constant distance between the balls and prevents their escape at the ends of the raceways 31, 32.

At the end of the rolling travel in one direction or the other, one of the balls is urged against one of the concave surfaces 34. A sliding is then produced between the complementary spherical surfaces due to a film of lubricant trapped therebetween while the ball rolls along the raceway of the barrel. Thus, when extra sliding is necessary, it occurs without much opposition, even under torque, and with no risk of wedging or jamming.

In another modification as shown in FIG. 10, the cage is eliminated. For this purpose, each bar 40 comprises a rectilinearly extending raceway divided into at least two segments 41, 42 by a wall 43 defining spherical surfaces 44. At least one respective ball 45, 46 is disposed in each raceway. Each segment is defined at its two ends by a respective spherical wall 47, 48 whose radius corresponds to that of the balls and which is connected to the cylindrical surface of the raceway.

Such raceways may be made cheaply and with precision by a cold-forming operation.

In the last two embodiments described hereinbefore, the bars are constructed in such manner as to have a thickness which gradually decreases in the direction of their ends so that they are capable of being elastically bent. Owing to this bending when operating under a torque, an automatic re-centering of the balls occurs on each side of the intermediate wall 33, 43.

In the modification shown in FIGS. 8 to 10, the load is distributed isostatically on the twelve balls, independently of the defects in shape. Consequently, there is a notable advantage from the point of view of capacity and length of life of the joint. This characteristic is not to be found in any sliding ball system.

According to another modification, the spherical trunnions may be formed by rollers fixed on cylindrical arms (for example fitted or welded thereon).

I claim:

1. A homokinetic joint comprising a first element extending along a first axis and carrying three radial arms evenly angularly spaced apart and defining spherical bearing surfaces, a second element having a second axis intersecting the first axis and capable of making an angle therewith, said second element defining three pairs of raceways, six intermediate elements, each of which is disposed between a respective one of said spherical bearing surfaces and a respective one of said raceways, rolling members being interposed between the intermediate elements and the adjacent raceways, wherein the raceways provided on the second element are cylindrical surfaces having a substantially circular cross-section and generatrices parallel to the axis of the second element and each intermediate element comprises on the side thereof facing the adjacent raceway, a raceway having a substantially cylindrical shape and a circular cross-section similar to that of the adjacent raceway on the second element and generatrices parallel to the axis of the second element, wherein each intermediate element undergoes an oscillating movement about the axis of the associated raceways when the joint operates at an angle, and the rolling members interposed between the intermediate elements and the raceways on the second element are balls.

2. A homokinetic joint according to claim 1, wherein the intermediate elements are bars defining on one side a spherical bearing surface cooperative with the complementary spherical bearing surface of the first element and, on an opposite side thereof, a raceway for the rolling members.

3. A homokinetic joint according to claim 2, wherein the bars have a thickness which decreases from a central portion toward ends thereof so as to have an elastically deformable capacity.

4. A homokinetic joint according to claim 1, comprising a cage for retaining the balls interposed between an intermediate element and the adjacent raceway.

5. A homokinetic joint according to claim 4, wherein each cage comprises ball retaining means on a side opposed to the raceway of the second element.

6. A homokinetic joint according to claim 4, wherein said cage comprises end-of-travel abutment means cooperative with end surfaces of the intermediate elements.

7. A homokinetic joint according to claim 1, comprising means constraining each cage to travel through one half of a travel effected by the center of a spherical bearing surface of the first element.

8. A homokinetic joint according to claim 7, wherein said constraining means comprise a pivot carried laterally by the cage, a gear journalled on the pivot, two racks respectively carried by the intermediate element and the second element with which racks the gear is engaged.

9. A homokinetic joint according to claim 1, wherein each intermediate element defines a cylindrical raceway divided into two portions by an intermediate wall.

10. A homokinetic joint according to claim 9, wherein the intermediate wall is connected to the cylindrical raceway by spherical surfaces having the same radius as the balls.

11. A homokinetic joint according to claim 9, wherein each intermediate element comprises a raceway divided into at least two segments each of which segments receives at least one ball, each segment being terminated at both ends thereof by a roughly spherical wall connected to the cylindrical surface of the adjacent raceway segment.

12. A homokinetic joint according to claim 1, wherein the center of each spherical bearing surface is radially outwardly offset relative to a line joining the axes of the associated raceways.

13. A homokinetic joint comprising a first element extending along a first axis and carrying three radial arms evenly angularly spaced apart and defining sperical bearing surfaces, a second element having a second axis intersecting the first axis and capable of making an angle therewith, said second element defining three pairs of raceways extending in a direction parallel to said second axis, six intermediate elements, each of which is disposed between a respective one of said spherical bearing surfaces and a respective one of said raceways, rolling members being interposed between rectilinearly extending raceways formed by cylindrical surfaces on the intermediate elements and the adjacent raceways on the second element, wherein the raceways provided on the second element are cylindrical surfaces on an inner surface thereof having a substantially circular cross-section and generatrices parallel to the axis of the second element, and the rolling members interposed between the intermediate elements and the raceways are balls, wherein each intermediate element undergoes an oscillating movement about the axis of the associated raceways when the joint operates at an angle.

14. A homokinetic joint according to claim 13, wherein each intermediate element comprises an elongated bar which increases in thickness towards a center portion thereof and which undergoes an oscillating movement about the axis of the associated raceways when the joint operates at an angle.

15. A homokinetic joint according to claim 13, wherein each intermediate element defines one of said rectilinearly extending raceways having two portions thereof separated by a radially outwardly extending intermediate wall.

16. A homokinetic joint according to claim 15, wherein the intermediate wall is connected to the cylindrical surface of each portion of the rectilinearly extending raceway by spherical surfaces having the same radius as the balls.

17. A homokinetic joint according to claim 15, wherein each intermediate element includes one of said rectilinearly extending raceways divided into at least two segments each of which segments receives at least one ball, each segment being terminated at opposite ends thereof by a roughly spherical wall connected to the cylindrical surface of the respective raceway segment.

18. A homokinetic joint according to claim 13, wherein the center of each spherical bearing surface is radially outwardly offset relative to a line joining the axes of the associated raceways on said second element.

* * * * *